United States Patent
Medow

(10) Patent No.: US 8,244,016 B2
(45) Date of Patent: Aug. 14, 2012

(54) METHOD FOR SUPPRESSING STREAK ARTIFACTS IN IMAGES PRODUCED WITH AN X-RAY IMAGING SYSTEM

(75) Inventor: Joshua E. Medow, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 637 days.

(21) Appl. No.: 12/505,763

(22) Filed: Jul. 20, 2009

(65) Prior Publication Data
US 2011/0013817 A1 Jan. 20, 2011

(51) Int. Cl.
*G06K 9/00* (2006.01)
(52) U.S. Cl. ............... 382/131; 378/7; 378/54; 378/62; 382/128
(58) Field of Classification Search .................. None
See application file for complete search history.

(56) References Cited

U.S. PATENT DOCUMENTS

| 5,243,664 | A | | 9/1993 | Tuy |
| 5,377,249 | A | * | 12/1994 | Wiesent et al. ............ 378/4 |
| 6,449,330 | B1 | | 9/2002 | Li et al. |
| 6,542,571 | B2 | | 4/2003 | Zooneveld |
| 7,023,951 | B2 | * | 4/2006 | Man ............................ 378/8 |
| 7,227,982 | B2 | * | 6/2007 | De Man et al. ............ 382/132 |
| 2006/0109949 | A1 | | 5/2006 | Tkaczyk et al. |
| 2006/0227928 | A1 | | 10/2006 | Timmer |
| 2007/0172104 | A1 | * | 7/2007 | Nishide et al. ............ 382/131 |

OTHER PUBLICATIONS

Yu Zou and Michael D. Silver, "Analysis of Fast kV-switching in Dual Energy CT using a Pre-reconstruction Decomposition Technique", 2008, Proc. of SPIE, vol. 6913, pp. 691313-1 through 691313-12.*

* cited by examiner

*Primary Examiner* — Jason M Repko
*Assistant Examiner* — Siamak Harandi
(74) *Attorney, Agent, or Firm* — Quarles & Brady LLP

(57) ABSTRACT

A method for reconstructing images from a set of acquired projection views weights the value backprojected into each image voxel depending on whether the backprojected raysum passes through a highly attenuating region in the subject of the image. If the raysum exceeds an attenuation threshold value, the backprojected values are weighted to substantially reduce the contribution of that raysum to the reconstructed image and to thereby reduce streak artifacts otherwise produced by high attenuation objects such as metal surgical clips.

13 Claims, 12 Drawing Sheets

|   | 1 | 2 | 3 |
|---|---|---|---|
| 1 |  | $V_{21}$ |  |
| 2 | $V_{12}$ | $V_{22}$ | $V_{32}$ |
| 3 |  | $V_{23}$ |  |

FIG. 2

METHOD FOR SUPPRESSING STREAK ARTIFACTS IN IMAGES PRODUCED WITH AN X-RAY IMAGING SYSTEM

BACKGROUND OF THE INVENTION

The field of the invention is x-ray imaging systems and methods. More particularly, the invention relates to suppressing image artifacts that result from highly attenuating objects.

In a computed tomography system, an x-ray source projects a fan-shaped beam which is collimated to lie within an x-y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce the transmission profile at a particular view angle.

The source and detector array in a conventional CT system are rotated on a gantry within the imaging plane and around the object so that the angle at which the x-ray beam intersects the object constantly changes. A group of x-ray attenuation measurements from the detector array at a given angle is referred to as a "view", and a "scan" of the object comprises a set of views acquired at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This process converts the attenuation measurements from a scan into integers called "CT numbers" or "Hounsfield units", which are used to control the brightness of a corresponding pixel on a display. Cone beam CT systems are similar to so-called "third generation" 2D CT systems in that the x-ray beam fans out, or diverges, in the plane of the imaging slices. In addition, however, the x-ray beam fans out in the perpendicular direction to acquire attenuation data for a plurality of image slices. Cone beam systems are also characterized by a 2D detector array which acquires data simultaneously for each image slice.

Most of the commercially available CT systems employ image reconstruction methods based on the concepts of Radon space and the Radon transform. For the pencil beam case, the data is automatically acquired in Radon space. Therefore a Fourier transform can directly solve the image reconstruction problem by employing the well-known Fourier-slice theorem. Such an image reconstruction procedure is called filtered backprojection (FBP). The success of FBP reconstruction is due to the translational and rotational symmetry of the acquired projection data. In other words, in a parallel beam data acquisition, the projection data are invariant under a translation and/or a rotation about the object to be imaged. For the fan beam case, one can solve the image reconstruction problem in a similar fashion; however, to do this an additional "rebinning" step is required to transform the fan beam data into parallel beam data. The overwhelming acceptance of the concepts of Radon space and the Radon transform in the two dimensional case gives this approach to CT image reconstruction a paramount position in tomographic image reconstruction.

C-arm x-ray systems are employed when it is desired to image a stationary patient from many different angles. C-arm x-ray systems are commonly used in interventional procedures where x-ray images are required often during a medical procedure and the physician must have access to the patient.

In C-arm x-ray systems, the x-ray source and the x-ray detector array are arranged opposite each other on the ends of a semicircular, C-shaped carrier. The C-arm can be rotated in the direction of the C-arm circumference in an "orbital direction", and in a direction perpendicular to this. The patient is positioned at the center of the C-arm and by rotating the C-arm about its two axes, x-ray views of the patient can be acquired at any desired angle. The C-arm x-ray system may be operated to acquire 2D fluoroscopic images from a desired view angle in real time as a medical procedure, such as catheterization, is performed. Alternatively, it may be operated to perform a volume CT scan or a tomosynthesis scan to produce a 3D image.

When a metallic object, such as a surgical clip, is present in a subject being imaged, artifacts will generally be present in the reconstructed image. Typically, these artifacts present as a series of dark and light streaks that emanate from metal objects in the subject and are hence commonly referred to as "streak artifacts". These artifacts degrade the overall quality of the images produced and, as a result, can confound clinical diagnoses. A number of different physical processes lend themselves to the production of streak artifacts. First, the metal object results in beam hardening, which is caused by the polychromatic x-ray beam spectrum and its energy dependent attenuation coefficients. Additionally, the large attenuations coefficients associated with metallic objects results in a low photon count in the imaging system detectors. The resulting under-range detection in the imaging system hardware reduces the overall signal-to-noise ratio of the reconstructed images. Lastly, nonlinear changes in the measured data appear as low-frequency tail artifacts around the metal objects, as well as between the metal and other high density objects.

Previous methods for streak artifact correction include replacing the projection signal produced by the metal object with a synthesized projection based on neighboring projection samples. Such previous methods are described by, for example, D. Felsenberg, et al., in "Reduction of Metal Artifacts in Computed Tomography—Clinical Experience and Results." *Electromedia*, 1988; (56):97-104. While these methods are effective in reducing the presence of streak artifacts, they also remove valuable information from the image. For example, information pertaining to the metal object itself is lost when using these methods. Furthermore, information about the region in immediate proximity of the metal object is also lost. There are many clinical applications where the interface between a metal object and the surrounding tissues is important, and thus the present methods of artifact suppression are inadequate.

Therefore, it would be desirable to have a system and method for controlling the impact of artifact-causing materials that does not result in significant data loss.

SUMMARY OF THE INVENTION

The present invention overcomes the aforementioned drawbacks by providing a method for substantially suppressing streak artifacts in images produced with an x-ray imaging system without the loss of information corresponding to the artifact producing object by producing backprojected values using raysum values for each ray path and adjusting the raysum values based on a predetermined threshold.

An aspect of the present invention provides a method for producing an image with an x-ray CT system which is not obscured by metal artifacts. More particularly, a data set is acquired with a CT system which includes a plurality of projections acquired at a corresponding plurality of gantry, or projection, angles. The integral attenuation coefficient values, or raysums, along each projection are subsequently weighted so that raysums above a user specified threshold contribute less to a given voxel location than those raysums below the threshold. As a result, an image is reconstructed in which streak artifacts resulting from metal or other highly attenuating regions within a subject are substantially suppressed.

The foregoing and other aspects of the invention will appear from the following description. In the description, reference is made to the accompanying drawings which form a part hereof, and in which there is shown by way of illustration one embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 2 is a pictorial representation of a spatial deconvolution method employed when practicing an embodiment of the present invention;

DETAILED DESCRIPTION OF THE INVENTION

Figure 1A:
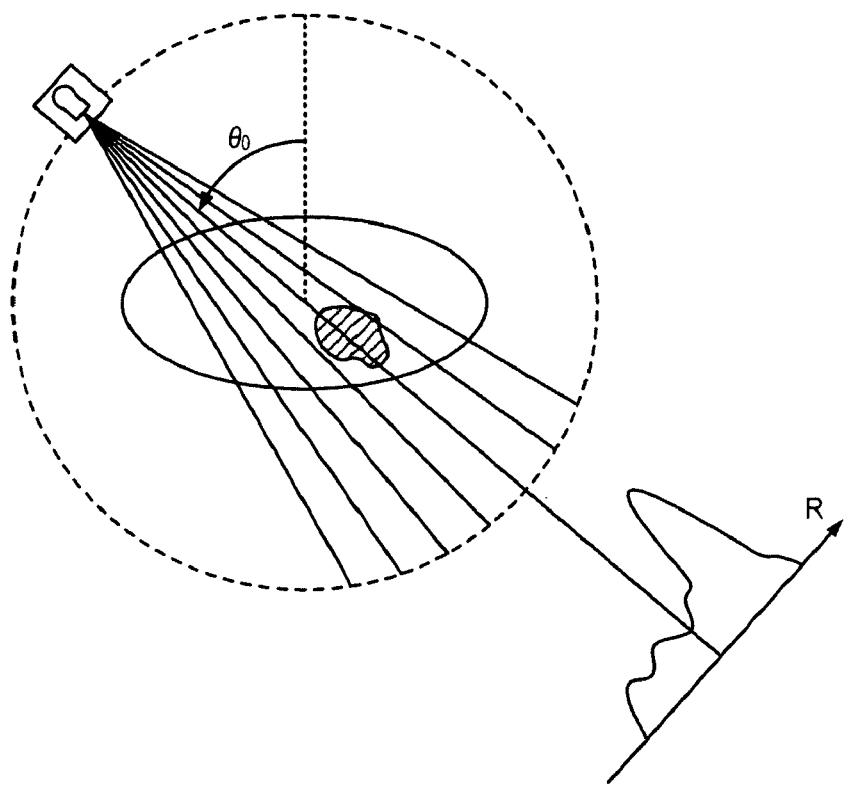
FIG. 1A is a pictorial representation of data acquisition in a parallel beam computed tomography imaging system.
Figure 1B:
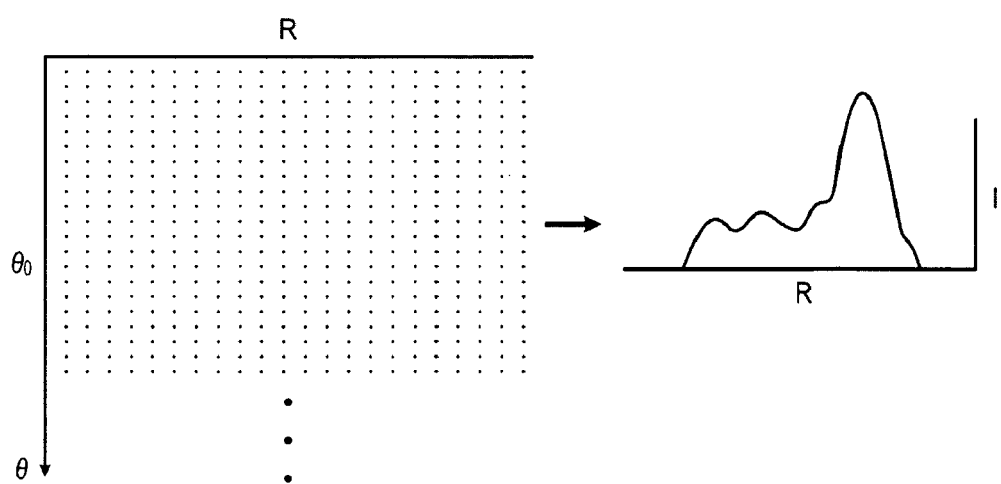
FIG. 1B is a pictorial representation of a plot of attenuation coefficient values along the projection view of FIG. 1A.

Considering, by way of example, a "third generation" CT imaging system, the image data acquired with such a system includes a set of projection views all acquired at the same axial position, $z_0$. As shown in FIG. 1A, each projection view is acquired at a specific view angle, $\theta$, and each detector attenuation measurement is at a location, R, in the detector array. As shown in FIG. 1B, the image data may be stored in a two dimensional array called a "sinogram." One dimension of the sinogram corresponds to the angular position of the fan beam, or view angle, $\theta$. The other dimension corresponds to positions of the detector elements, R, of the detector array. As the detector array in a fan beam CT system generally includes a single row of detector elements, each row of the sinogram corresponds to a discrete view angle, $\theta$, and a single axial position, $z_0$.

A sinogram obtained in this manner is a collection of projection views of the subject at the position, $z_0$. Here the term "projection view" means such a row of projection data corresponding to a given view angle, $\theta$, and representing the imaged subject at a single axial position, $z_0$. Well known tomographic image reconstruction procedures utilize as their principal inputs a complete set of such projection views (discretized in $\theta$, but all containing data values for the same axial position, $z_0$). The projection views are processed by such tomographic techniques to reconstruct a slice image depicting the internal features of the subject in a slice located at the position, $z_0$.

FIG. 1A illustrates the correspondence between a particular view angle, $\theta_0$, for the x-ray source and the generation of a well defined row, R, of projection data. In the fan beam case, as noted above, the detector data from the detector array may convert directly into a single row of projection data for a projection view at view angle, $\theta_0$. This correspondence results because the detector array provides a single row of detector data representing intensities, I, of the x-rays impinging upon the detector elements. These intensity values, I, indicate attenuation information for the subject at the axial position, $z_0$.

FIG. 1B shows how the projection data for the particular view angle, $\theta_0$, is stored in a corresponding row of the sinogram. Each row of this sinogram thus constitutes a projection view that indicates attenuation information, I, for a distinct view angle, $\theta$, at the same axial position, $z_0$. The integral value of the intensities, I, along a projection view that corresponds to a particular view angle, $\theta_0$, is referred to as the "raysum," $p_0$, and has the form:

$$p_0 = \int_\theta \mu(x) dx,$$

where $\mu(x)$ is the attenuation coefficient at a point x along the projection view. Once the sinogram is filled with projection views for all the discrete view angles, $\theta$, around the subject, then the image reconstruction method of the present invention is applied to reconstruct a cross-sectional image of the subject in which streak artifacts are substantially suppressed.

An embodiment of the present invention is based on the premise that there is more inherent error in higher valued raysums that in lower valued raysums because quantum noise and hysteresis become more prominent. Voxels representing areas containing metal have a high attenuation coefficient and will have corresponding raysums that also pass through other voxels having lower attenuation coefficient values. The result is that error introduced by higher value raysums is large with respect to the lower voxel values where the raysum is shared. Such errors result in streaking artifacts in the reconstructed image, which is a consequence of inconsistent data present during one-dimensional fast Fourier transform filtering.

In accordance with an embodiment of the present invention, raysums are backprojected first and then raysums having a value above a user specified threshold are assigned a lower weight than lower valued raysums. The result of this process is that voxels that should have lower values than those voxels containing metal or other materials with high attenuation coefficient values have limited contributions from the voxels having higher values. Effectively, on a voxel-by-voxel basis, contributions by error prone raysums are mathematically reduced by using low weighting. This results in suppressed artifacts and data inconsistencies in the resulting images. Such an embodiment of the present invention is referred to as the "Range Adjusted Dynamic Image Construction Algorithm" (RADICAL). After image reconstruction, the reconstructed image is deconvolved either by a two-dimensional fast Fourier transform or a spatial deconvolution method referred to as a "Decay Rate Integrated Voxel Engine" (DRIVE), such as the method described below.

Figure 2:
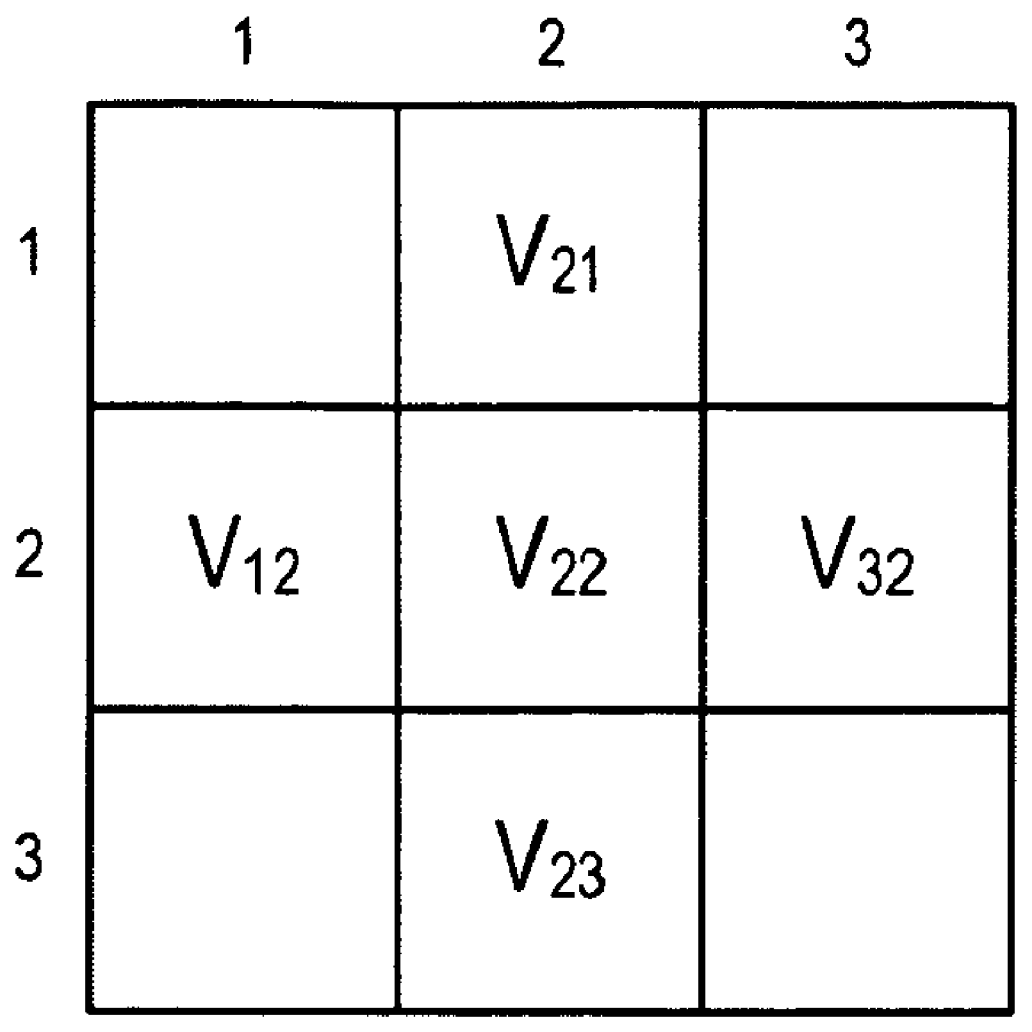

Referring particularly to FIG. 2, a method of DRIVE spatial deconvolution employed when practicing the present invention begins by analyzing an array of voxels, for example a 3-by-3 array, including a central voxel that is being deconvolved. The differences or ratios of the central voxel to voxels along an orthogonal line are measured, and the decay rate of the values along this line determines the true value of the central voxel. This process is repeated for each voxel in the image so that a reconstructed image is produced. In general, and for a 3-by-3 voxel array, the following equation is utilized to deconvolve a central voxel:

$$I_{22} = \frac{V_{22}(1-\lambda^4) - V_{12}(\lambda-\lambda^3) - V_{32}(\lambda-\lambda^3)}{1+\lambda^4 - 2\lambda^2},$$

where $\lambda$ is a decay rate; $V_{12}$, $V_{22}$, and $V_{32}$ are the image intensity values in the first, second, and third voxels along the central horizontal row in an exemplary 3-by-3 array of voxels; and $I_{22}$ is the deconvolved image intensity value for the central voxel location in the exemplary 3-by-3 voxel array. The decay rate is selected before the deconvolution process. In one embodiment of the present invention a decay rate of $\lambda=\frac{1}{2}$ is employed; however, in the alternative, different decay rate values may be employed depending on the clinical application at task and the degree of deconvolution desired. Moreover, a larger deconvolution kernel can be utilized. For example, a 5-by-5 voxel array can be employed.

Figure 3A:
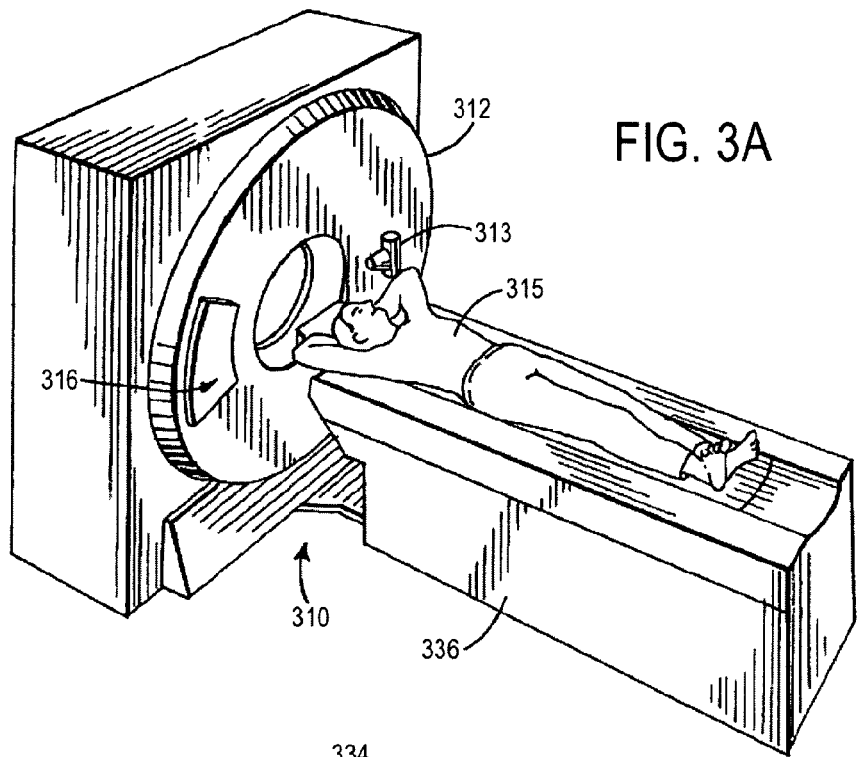
FIG. 3A is a perspective view of a computed tomography (CT) imaging system.
Figure 3B:
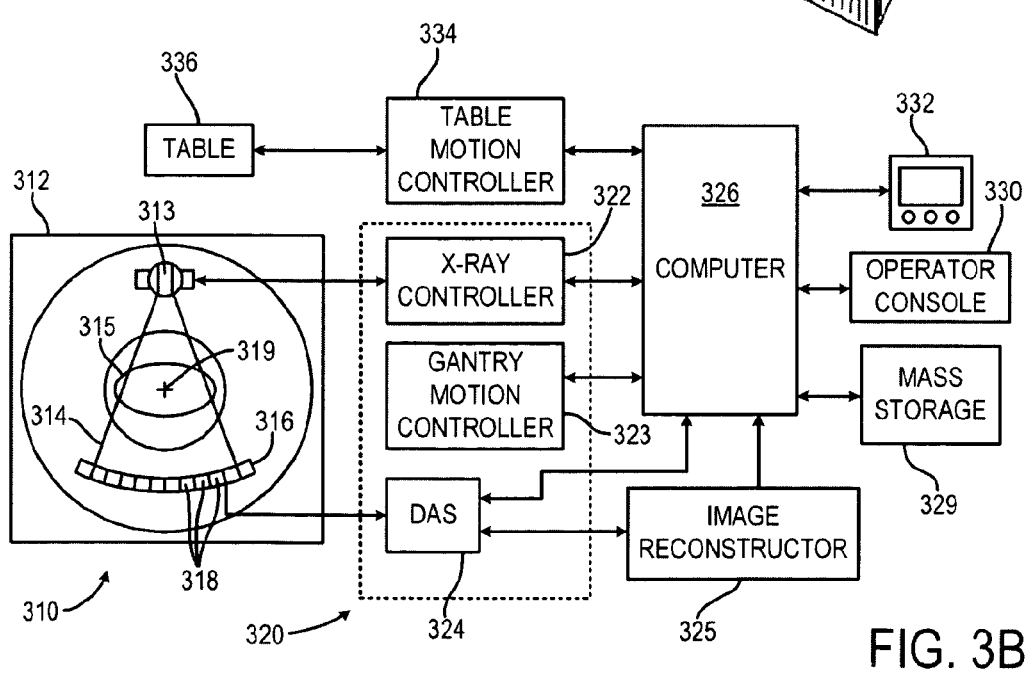
FIG. 3B is a block diagram of the CT imaging system of FIG. 3A.

With initial reference to FIGS. 3A and 3B, a computed tomography (CT) imaging system 310, which employs an embodiment of the invention, includes a gantry 312 representative of a so-called "third generation" CT scanner. Gantry 312 has an x-ray source 313 that projects a fan beam (or cone beam) of x-rays 314 toward a detector array 316 on the opposite side of the gantry. The detector array 316 is formed by a number of detector elements 318 which together sense the projected x-rays that pass through a medical patient 315. Each detector element 318 produces an electrical signal that represents the intensity of an impinging x-ray beam and hence the attenuation of the beam as it passes through the patient. During a scan to acquire x-ray projection data, the gantry 312 and the components mounted thereon rotate about a center of rotation 319 located within the patient 315.

The rotation of the gantry and the operation of the x-ray source 313 are governed by a control mechanism 320 of the CT system. The control mechanism 320 includes an x-ray controller 322 that provides power and timing signals to the x-ray source 313 and a gantry motor controller 323 that controls the rotational speed and position of the gantry 312. A data acquisition system (DAS) 324 in the control mechanism 320 samples analog data from detector elements 318 and converts the data to digital signals for subsequent processing. An image reconstructor 325, receives sampled and digitized x-ray data from the DAS 324 and performs high speed image reconstruction. The reconstructed image is applied as an input to a computer 326 which stores the image in a mass storage device 329.

The computer 326 also receives commands and scanning parameters from an operator via console 330 that has a keyboard. An associated display 332 allows the operator to observe the reconstructed image and other data from the computer 326. The operator supplied commands and parameters are used by the computer 326 to provide control signals and information to the DAS 324, the x-ray controller 322, and the gantry motor controller 323. In addition, computer 326 operates a table motor controller 334 which controls a motorized table 336 to position the patient 315 in the gantry 312.

Figure 4A:
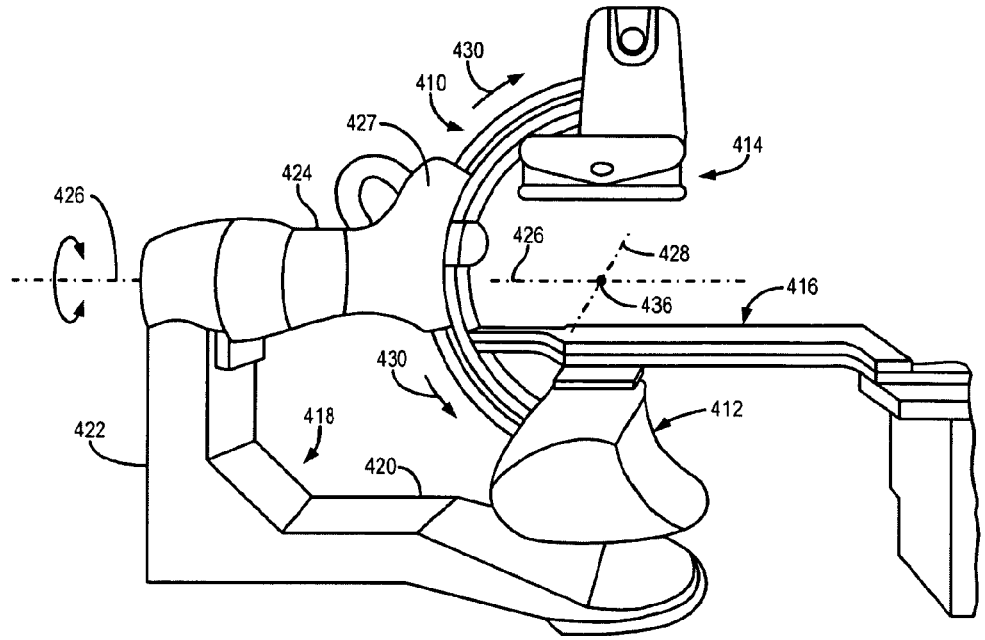
FIG. 4A is a pictorial view of a C-arm x-ray imaging system.
Figure 4B:
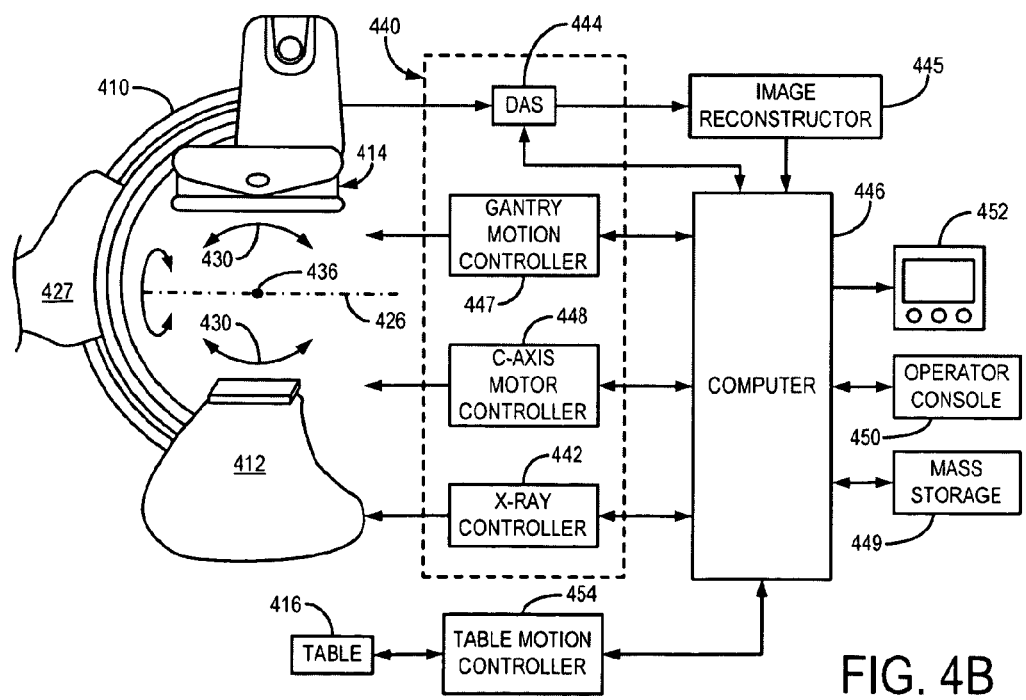
FIG. 4B is a block diagram of the C-arm x-ray imaging system of FIG. 4A.

Referring particularly to FIGS. 4A and 4B, an embodiment of the invention employed to reconstruct images employs an x-ray system that is designed for use in connection with interventional procedures. It is characterized by a gantry having a C-arm 410 which carries an x-ray source assembly 412 on one of its ends and an x-ray detector array assembly 414 at its other end. The gantry enables the x-ray source 412 and detector 414 to be oriented in different positions and angles around a patient disposed on a table 416, while enabling a physician access to the patient.

The gantry includes an L-shaped pedestal 418 which has a horizontal leg 420 that extends beneath the table 416 and a vertical leg 422 that extends upward at the end of the horizontal leg 420 that is spaced from of the table 416. A support arm 424 is rotatably fastened to the upper end of vertical leg 422 for rotation about a horizontal pivot axis 426. The pivot axis 426 is aligned with the centerline of the table 416 and the arm 424 extends radially outward from the pivot axis 426 to support a C-arm drive assembly 427 on its outer end. The C-arm 410 is slidably fastened to the drive assembly 427 and is coupled to a drive motor (not shown) which slides the C-arm 410 to revolve it about a C-axis 428 as indicated by arrows 430. The pivot axis 426 and C-axis 428 intersect each other at an isocenter 436 located above the table 416 and they are perpendicular to each other.

The x-ray source assembly 412 is mounted to one end of the C-arm 410 and the detector array assembly 414 is mounted to its other end. As will be discussed in more detail below, the x-ray source 412 emits a cone beam of x-rays which are directed at the detector array 414. Both assemblies 412 and 414 extend radially inward to the pivot axis 426 such that the center ray of this cone beam passes through the system isocenter 436. The center ray of the cone beam can thus be rotated about the system isocenter around either the pivot axis 426 or the C-axis 428, or both during the acquisition of x-ray attenuation data from a subject placed on the table 416.

Figure 5A:
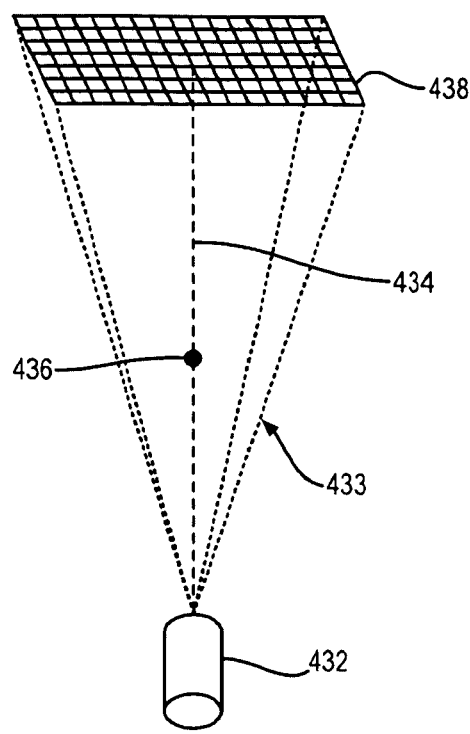
FIG. 5A is a pictorial view of the x-ray source and detector in the C-arm x-ray imaging system of FIGS. 4A and 4B.

As shown in FIG. 5A, the x-ray source assembly 412 contains an x-ray source 432 which emits a cone beam 433 of x-rays when energized. The center ray 434 passes through the system isocenter 436 and impinges on a two-dimensional flat panel digital detector 438 housed in the detector assembly 414. The detector 438 is a 2048 by 2048 element two-dimensional array of detector elements having a size of 41 cm by 41 cm. Each element produces an electrical signal that represents the intensity of an impinging x-ray and hence the attenuation of the x-ray as it passes through the patient. During a scan the x-ray source 432 and detector array 438 are rotated about the system isocenter 436 to acquire x-ray attenuation projection data from different angles. The detector array is able to acquire 30 projections, or views, per second and this is the limiting factor that determines how many views can be acquired for a prescribed scan path and speed.

Figure 5B:
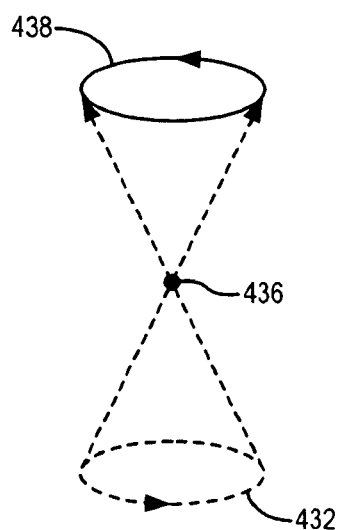
FIG. 5B is a pictorial view of the C-arm scan path employed by the C-arm x-ray system of FIGS. 4A and 4B.

Referring particularly to FIG. 5B, the rotation of the assemblies 412 and 414 and the operation of the x-ray source 432 are governed by a control mechanism 440 of the CT system. The control mechanism 440 includes an x-ray controller 442 that provides power and timing signals to the x-ray source 432. A data acquisition system (DAS) 444 in the control mechanism 440 samples data from detector elements 438 and passes the data to an image reconstructor 445. The image reconstructor 445, receives digitized x-ray data from the DAS 444 and performs high speed image reconstruction according to the methods of the present invention. The reconstructed image is applied as an input to a computer 446 which stores the image in a mass storage device 449 or processes the image further.

The control mechanism 440 also includes pivot motor controller 447 and a C-axis motor controller 448. In response to motion commands from the computer 446 the motor controllers 447 and 448 provide power to motors in the x-ray system that produce the rotations about respective pivot axis 426 and C-axis 428. A program executed by the computer 446 generates motion commands to the motor drives 447 and 448 to move the assemblies 412 and 414 in a prescribed scan path.

The computer 446 also receives commands and scanning parameters from an operator via console 450 that has a keyboard and other manually operable controls. An associated cathode ray tube display 452 allows the operator to observe the reconstructed image and other data from the computer 446. The operator supplied commands are used by the computer 446 under the direction of stored programs to provide control signals and information to the DAS 444, the x-ray controller 442 and the motor controllers 447 and 448. In addition, computer 446 operates a table motor controller 454 which controls the motorized table 416 to position the patient with respect to the system isocenter 436.

Figure 6:
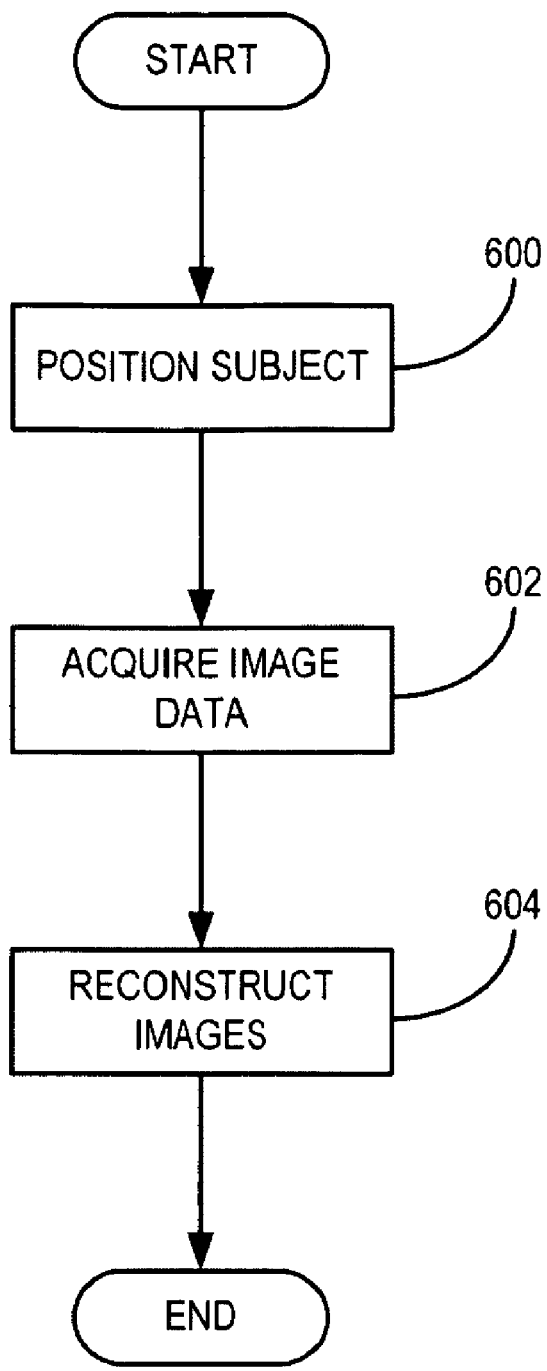
FIG. 6 is a flowchart setting forth the steps of a general imaging session of a subject.

Referring particularly to FIG. 6, the imaging of a subject while practicing the present invention begins by positioning the subject in the field-of-view of an imaging system, such as those described above, as indicated in step 600. While the imaging system that employs the present invention is an x-ray imaging system such as an x-ray computed tomography (CT) imaging system or C-arm imaging system, it should be appreciated by those skilled in the art that other imaging systems may also employ the present invention. For example, a single photon emission computed tomography (SPECT) or positron emission tomography (PET) imaging system may employ the present invention.

After the subject has been positioned in the imaging system, image data is acquired in step 602. The acquired image data is then processed according to the method of the present invention so that images having substantially suppressed image artifacts resulting from regions having high attenuation coefficient values are produced, as indicated in step 604 and described in more detail below. The image reconstruction process can be performed either in real-time as further data is acquired, or as an off-line process after all of the image data has been acquired. It should be appreciated by those skilled in the art that when the present invention is practiced during an interventional procedure, such as endovascular coiling of an aneurysm, it is advantageous to utilize real-time image reconstruction. In general clinical applications, however, it may be sufficient to reconstruct images only after data acquisition has been completed.

Figure 7:
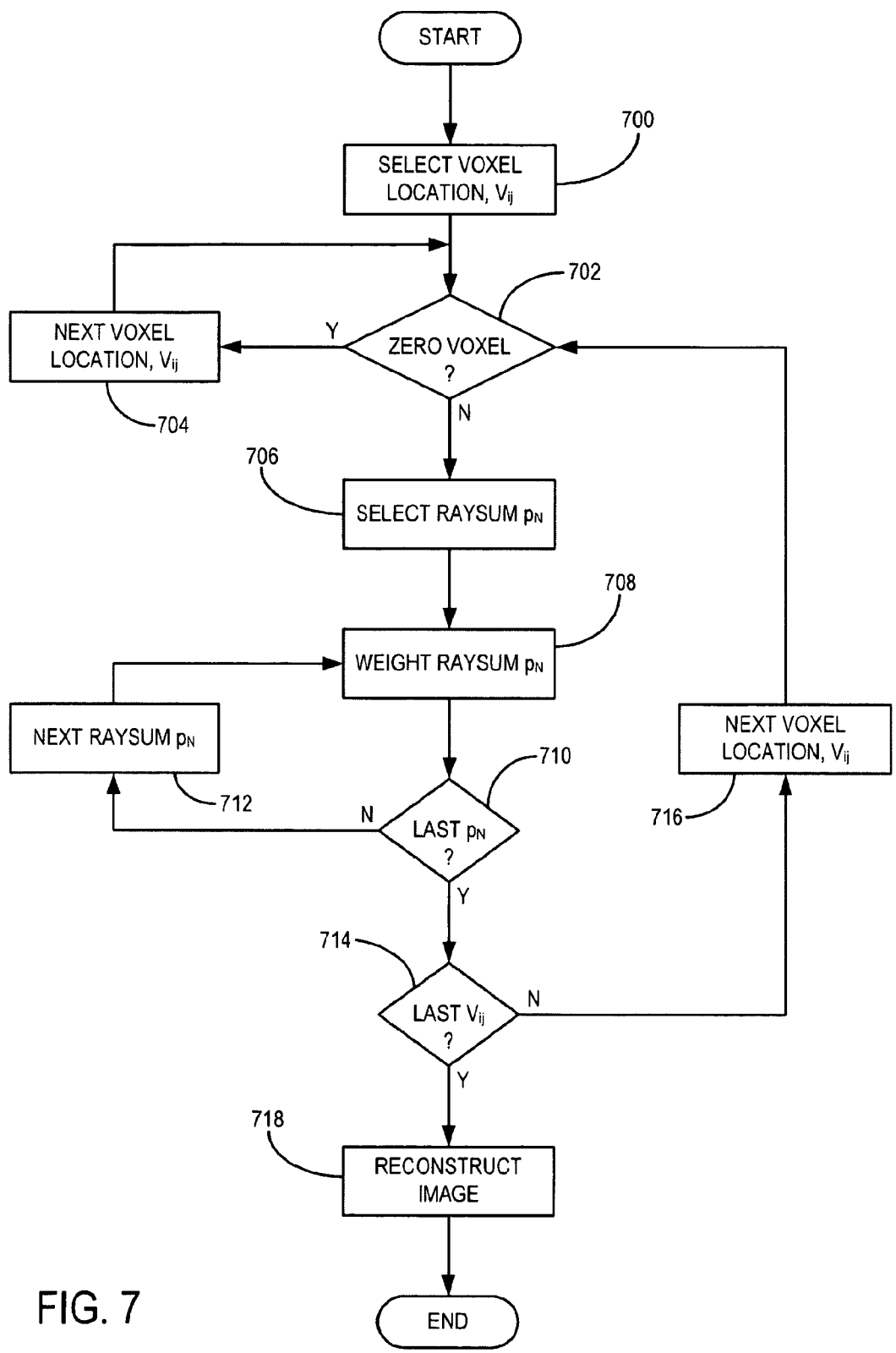
FIG. 7 is a flowchart setting forth the steps of an image reconstruction method performed in accordance with the present invention.

Referring particularly to FIG. 7, the RADICAL image reconstruction process begins by weighting raysum values in accordance with the aforementioned embodiment of the invention. First, a voxel location, $V_{ij}$, in the imaging field-of-view is selected, as indicated in step 700. A determination is then made at step 702 as to whether or not any of the raysums contributing to the voxel location, $V_{ij}$, are substantially zero. When the selected voxel location, $V_{ij}$, has a contribution from a significant number of raysums that are each substantially zero, the voxel location, $V_{ij}$, is flagged to be skipped during the image reconstruction, as will be described below in detail. Thus, in the reconstructed image, a value of zero is assigned to the voxel at the voxel location, $V_{ij}$. For example, if the selected voxel location, $V_{ij}$, is intersected by a projection view that is outside of the subject being imaged, its corresponding raysum is likely substantially equal to zero. This is because the x-rays traveling along this particular projection view will attenuated less than those which pass through the subject. Since projection views that do not pass through the subject being imaged do not contain information about the subject, any voxel location, $V_{ij}$, that corresponds to a significant number of raysums having a value substantially equal to zero is assumed to lie outside of the subject. The value of such a voxel in an image produced by conventional reconstruction methods will, accordingly, be substantially zero. Therefore, the computational burden of image reconstruction is lessened by skipping the reconstruction of voxels that would be substantially equal to zero when reconstructed by conventional image reconstruction methods. The process described above is repeated for every voxel location, $V_{ij}$, in the imaging field-of-view, with subsequent voxel locations, $V_{ij}$, selected at step 704. However, when the selected voxel, $V_{ij}$, does not have a contribution from a raysum that is substantially zero, the process proceeds for that voxel location, $V_{ij}$, as described below.

First, a raysum, $p_N$, corresponding to the voxel location, $V_{ij}$, is selected in step 706. At step 708, the raysum is weighted depending on whether or not its value is above a selected threshold. When the value of the raysum, $p_N$, is above the selected threshold, it is weighted so that its contribution to the selected voxel location, $V_{ij}$, is lessened. For example, if a raysum has a value above a selected threshold of 1100 Hounsfield units, then the value of the raysum is weighted to a value of $1/1000$ Hounsfield units. In this manner, the contribution of a raysum, $p_N$, to a voxel corresponding to the voxel location, $V_{ij}$, is lessened when the raysum, $p_N$, contains information of a highly attenuating region within the subject. A method for weighting the individual raysums is further described in detail below. This method results in a reconstructed image having substantially suppressed streak artifacts. Until all of the raysums, $p_N$, that contribute to the voxel location, $V_{ij}$, have been processed, as determined at decision block 710, subsequent raysums, $p_N$, are selected for processing at step 712.

This weighting process continues until all the voxel locations, $V_{ij}$, in the field-of-view have been processed. The system loops back, as indicated by process block 716, until all of the voxel locations, $V_{ij}$, have been processed, as determined at decision block 714. Image reconstruction from the image data, including the weighted raysums, $p_N$, occurs at step 718 so that an image having substantially suppressed streak artifacts is produced.

The reconstruction method employed by the present invention is, for example, a standard backprojection method; however, after an image is reconstructed it undergoes a spatial deconvolution process. An exemplary image reconstruction process is described below with reference to FIG. 10. Likewise, an exemplary spatial deconvolution method is described above with reference to FIG. 2, and further described herein. In such a method, an array of voxels that includes a current voxel being deconvolved is selected. At least two operations are subsequently performed. First, and when utilizing a 3-by-3 voxel array, the deconvolved value of the central voxel is determined using the central horizontal row of voxels in the array in accordance with the following equation:

$$I_{22}^{(H)} = \frac{V_{22}(1-\lambda^4) - V_{12}(\lambda-\lambda^3) - V_{32}(\lambda-\lambda^3)}{1+\lambda^4-2\lambda^2},$$

where $\lambda$ is a decay rate; $V_{12}$, $V_{22}$, and $V_{32}$ are the image intensity values in the first, second, and third voxels along the central horizontal row in the array of voxels; and $I_{22}^{(H)}$ is the deconvolved image intensity value for the central voxel as determined along the central vertical line of voxels in the array. As described above, in one embodiment of the present invention, a decay rate of $\lambda=\frac{1}{2}$ is employed. Subsequently, the deconvolved value of the central voxel is determined using the central vertical row of voxels in the array in accordance with the following equation:

$$I_{22}^{(V)} = \frac{V_{22}(1-\lambda^4) - V_{21}(\lambda-\lambda^3) - V_{23}(\lambda-\lambda^3)}{1+\lambda^4-2\lambda^2},$$

where $V_{21}$, $V_{22}$, and $V_{23}$ are the image intensity values in the first, second, and third voxels along the central vertical row in the array of voxels, and $I_{22}^{(V)}$ is the deconvolved image intensity value for the central voxel as determined along the central vertical line of voxels in the array. Subsequently, the value of the central voxel is set as the average of the horizontal, $I_{22}^{(H)}$, and vertical, $I_{22}^{(V)}$, deconvolved values. In the alternative, a method such as a two-dimensional fast Fourier transformation may be employed to deconvolve reconstructed images.

Figure 8:
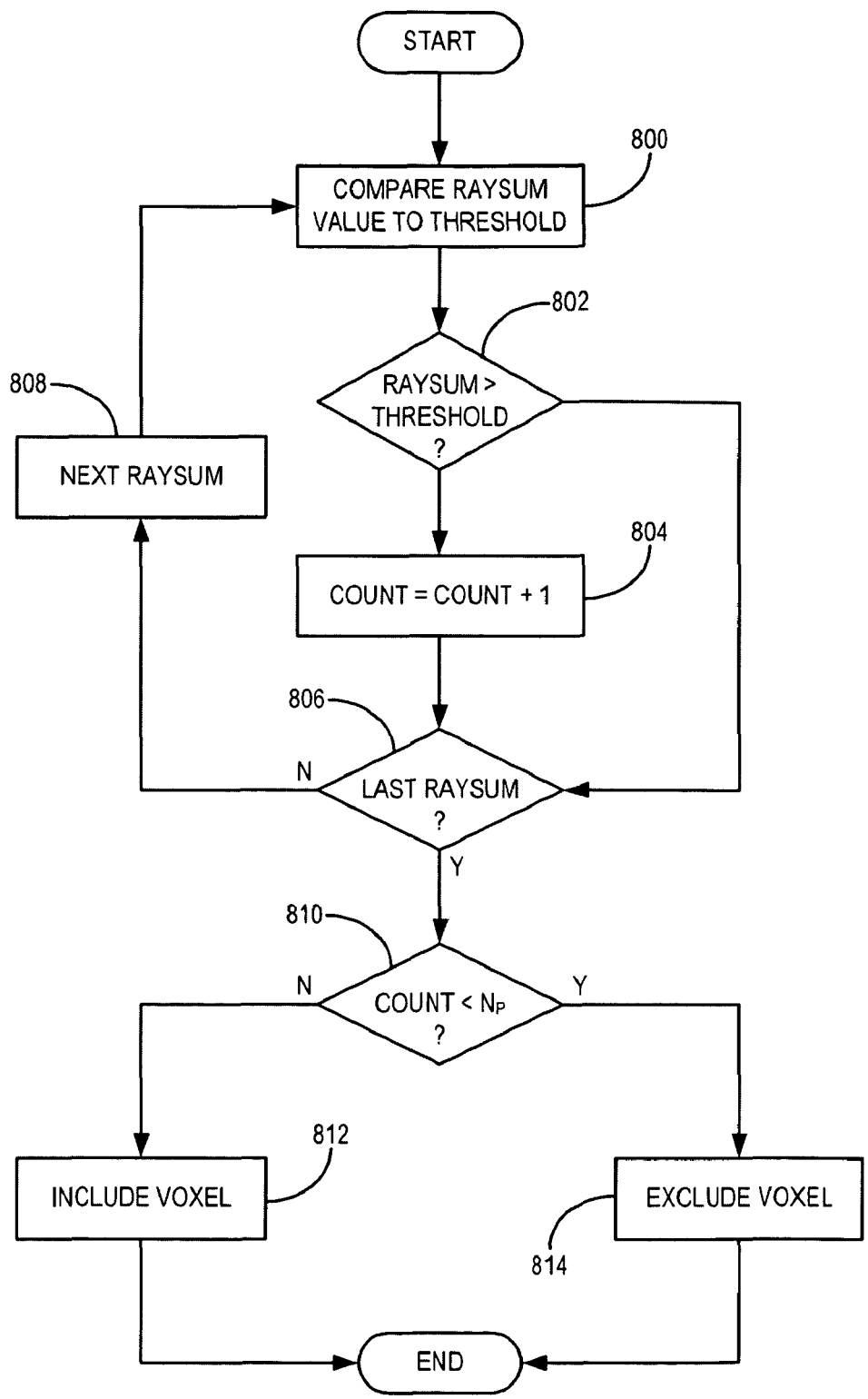
FIG. 8 is a flowchart setting forth the steps of a backprojection limited anisotropic construction kernel ("BLACK") method for determining whether to include or exclude a selected voxel location during image reconstruction.

Referring particularly now to FIG. 8, a method for determining whether to exclude a voxel location, $V_{ij}$, from the image reconstruction process using a backprojection limited anisotropic construction kernel ("BLACK") method begins by comparing the values of each raysum at the voxel location, $V_{ij}$, to a threshold value, as indicated at step 800. A threshold value of substantially zero is employed such that those raysums having a value substantially equal to zero are counted. As decided at decision block 802, if a raysum value is above the threshold value, then the raysum is counted at step 804; however, if the raysum value is below the threshold, then it is not counted. If all of the raysums associated with the voxel location, $V_{ij}$, have been processed, as decided at decision block 806, then the method proceeds at this time. If not, then the next raysum is selected at step 808 and the process loops back to compare the new raysum with the threshold value at step 802. When all of the raysums have been processed, an evaluation is made at decision block 810 whether the number of raysums counted as above the threshold value is greater than the total number of projections passes through the voxel location, $V_{ij}$. If so, then the voxel location, $V_{ij}$, is flagged for inclusion in the image reconstruction process, as indicated at step 812. However, if the raysum count is less than the total number of projections then the voxel location, $V_{ij}$, is flagged for exclusion from the image reconstruction process, as indicated at step 814.

Figure 9:
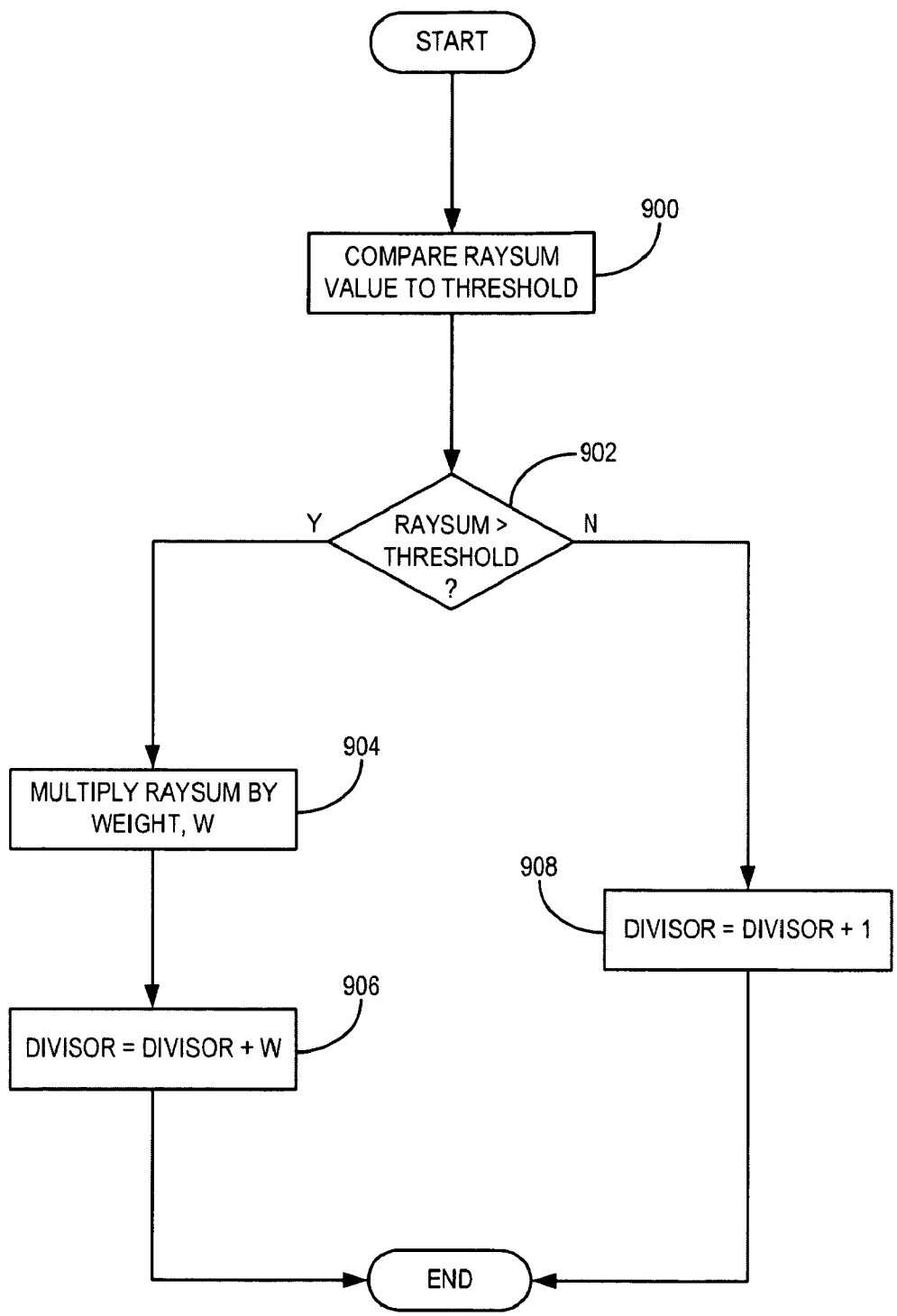
FIG. 9 is a flowchart setting forth the steps of a range adjusted dynamic image construction algorithm ("RADI-CAl") for suppressing image artifacts.

Referring particularly now to FIG. 9, a method for weighting raysum values using a range adjusted dynamic image construction algorithm ("RADICAl") begins by comparing the selected raysum value to a threshold, as indicated at step 900. Exemplary selected thresholds include 1100 Hounsfield units; however, it should be appreciated by those skilled in the art that other threshold values can also be employed. A determination is made at decision block 902 whether the selected raysum value is above the threshold. If so, then the raysum value is first multiplied by a weighting factor, W, as indicated at step 904. An exemplary weighting factor, W, is $\frac{1}{100}$; however, it will be appreciated by those skilled in the art that other values of the weighting factor, W, can be employed. After the raysum value has been weighted, a divisor count is incremented by the value of the weighting factor, W, as indicated at step 906. For example, if the selected raysum is the first raysum being processed for the current voxel location, $V_{ij}$, then the divisor count is equal to zero. After weighting the raysum; however, the divisor would be incremented to a value of W. Using the aforementioned example, the divisor count would have a value of 0.001. Referring again to decision block 902, if the raysum value is below the threshold value then the raysum is not weighted. However, as indicated at step 908, the divisor count is incremented by a value of one. It is noted, then, that a divisor count is uniquely calculated for each voxel location. If none of the raysums associated with the voxel location, $V_{ij}$, are weighted in the aforementioned process, then the divisor count for that voxel location, $V_{ij}$, will be equal to the number of projections passes through the voxel location, $V_{ij}$. If, however, some of the raysums are weighted, then the divisor count will be decreased.

Figure 10:
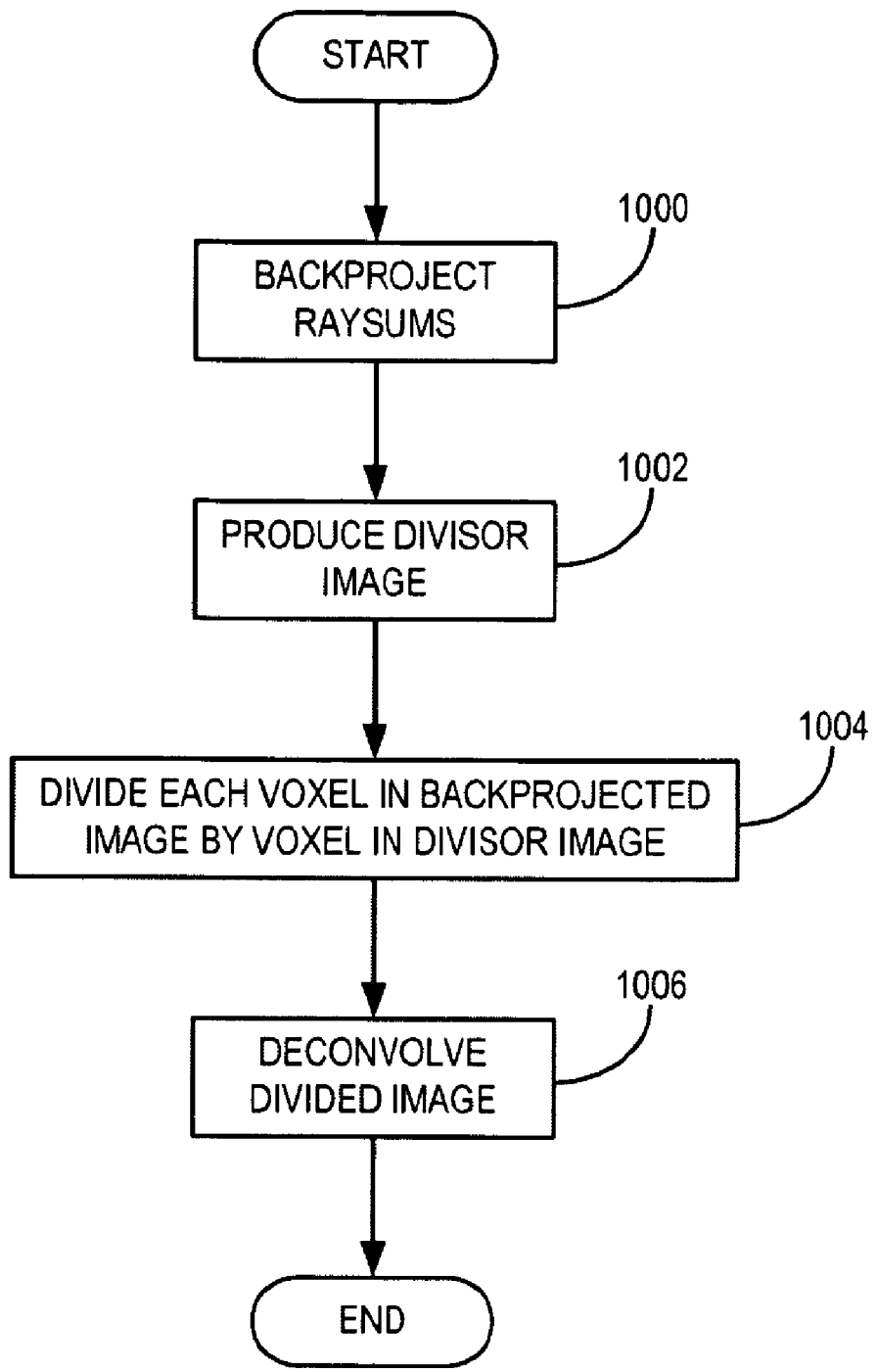
FIG. 10 is a flowchart setting forth the steps of an image reconstruction and deconvolution process.

Referring particularly now to FIG. 10, a method for reconstructing images from the processed raysums beings by back-projecting the processed raysums to form a backprojected image, as indicated at step 1000. Subsequently, a divisor image having the same dimensions as the backprojected image is produced, as indicated at step 1002. The divisor image is produced by assigning each voxel location in the divisor image a voxel value equal to the divisor determined above for the corresponding voxel location, $V_{ij}$. The backprojected image is then weighted by the divisor image through a voxel-wise division of the backprojected image by the divisor image, as indicated at step 1004. The resulting divided image is then deconvolved as described above, and as indicated at step 1006.

An illustrative example of how the present invention is employed is shown in FIGS. 11A-D. Within an imaging field-of-view 1100 is an object 1102 that includes a highly attenuating region 1104 that includes a material having a large attenuation coefficient with respect to the surrounding area.

Figure 11A:
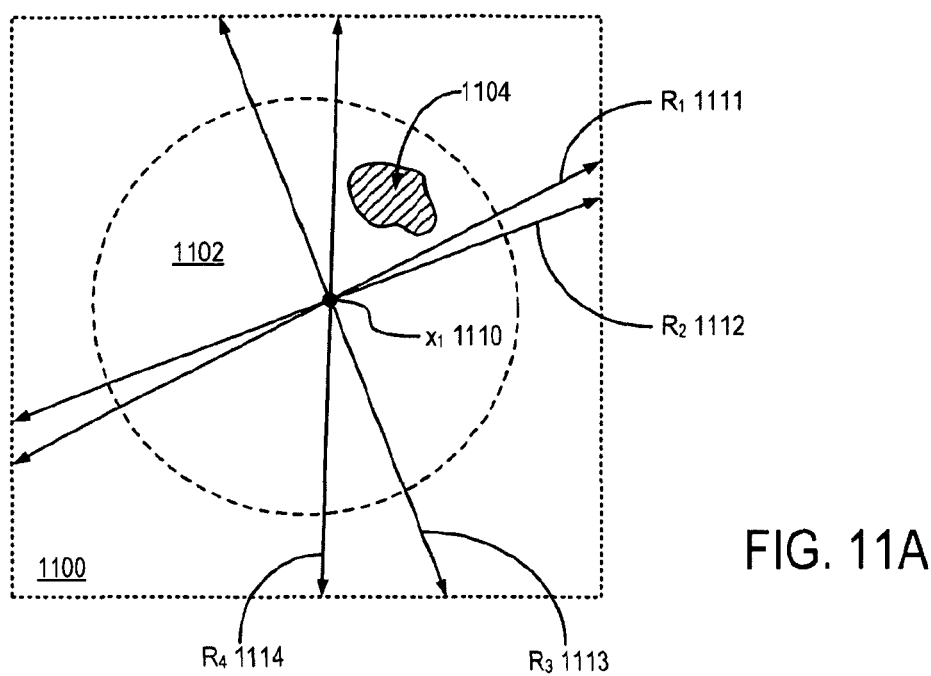
FIG. 11A is a pictorial representation of an exemplary point in image data acquired from a subject that is processed according to a method of the present invention.

Referring to FIG. 11A, "typical" voxels in the subject are not affected by the method of the present invention. Such a typical point $x_1$ 1110 in the object 1102 is represented by a corresponding voxel, $V_1$, in a reconstructed image. Contributions to the image intensity of the voxel, $V_1$, include information from four raysums, $p_1$, $p_2$, $p_3$, and $p_4$. Accordingly, the four raysums ($p_1$, $p_2$, $p_3$, and $p_4$) correspond to the summed attenuation coefficients along the respective projections, $R_1$ 1111, $R_2$ 1112, $R_3$ 1113, and $R_4$ 1114. As each projection ($R_1$ 1111, $R_2$ 1112, $R_3$ 1113, and $R_4$ 1114) passes through the object 1102, none of the raysums are substantially equal to zero. Therefore, the voxel $V_1$, corresponding to point $x_1$ 1110 is not set to zero as described above with respect to step 702. Instead, the reconstruction process proceeds as indicated above at step 706. Because none of the projections ($R_1$ 1111, $R_2$ 1112, $R_3$ 1113, and $R_4$ 1114) pass through the highly attenuating region 1104, none of the corresponding raysums ($p_1$, $p_2$, $p_3$, and $p_4$) will include attenuation coefficient values indicative of the highly attenuating region 1104. Therefore, none of the raysums ($p_1$, $p_2$, $p_3$, and $p_4$) will have a value above the selected threshold and, accordingly, will not be weighted as described above in step 708.

Figure 11B:
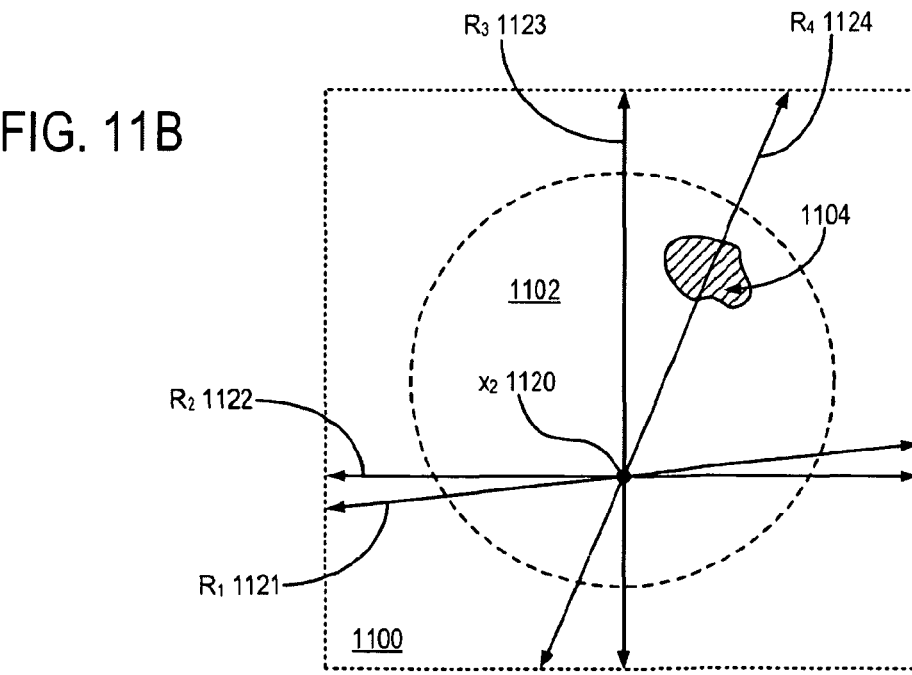
FIG. 11B is another pictorial representation of an exemplary point in image data acquired from a subject that is processed according to a method of the present invention.

Referring particularly to FIG. 11B, voxels in the subject that are formed by one or more raysums that pass through the highly attenuating region 1104 are affected by the weighting process according to the present invention. Such a point $x_2$ 1120 in the object 1102 is represented by a corresponding voxel, $V_2$, in a reconstructed image. Contributions to the image intensity of the voxel, $V_2$, include information from four raysums, $p_1$, $p_2$, $p_3$, and $p_4$. Accordingly, the four raysums ($p_1$, $p_2$, $p_3$, and $p_4$) correspond to the summed attenuation coefficients along the respective projections, $R_1$ 1121, $R_2$ 1122, $R_3$ 1123, and $R_4$ 1124. Since each projection ($R_1$ 1121, $R_2$ 1122, $R_3$ 1123, and $R_4$ 1124) passes through the object 1102, none of the corresponding raysums ($p_1$, $p_2$, $p_3$, and $p_4$) are substantially equal to zero. Therefore, the voxel, $V_2$, corresponding to point $x_2$ 1120 is not set to zero as described above with respect to step 702. Instead, the reconstruction process proceeds as indicated above at step 706. Because projection $R_4$ 1124 passes through the highly attenuating region 1104, the corresponding raysum, $p_4$, will include attenuation coefficient values indicative of the highly attenuating region 1104. Therefore, the raysum, $p_4$, will have a value above the selected threshold and will accordingly be weighted so that its contribution to the resulting image voxel is mitigated as described above in step 708. The other raysums ($p_1$, $p_2$, and $p_3$) will not be weighted.

Figure 11C:
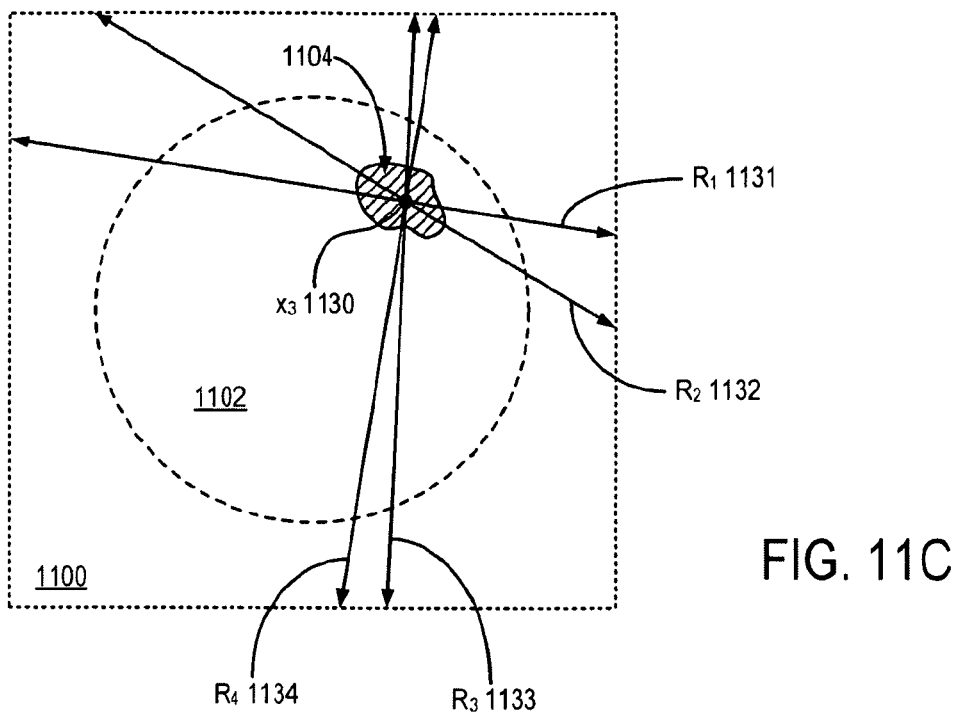
FIG. 11C is yet another pictorial representation of an exemplary point in image data acquired from a subject that is processed according to a method of the present invention.
Figure 11D:
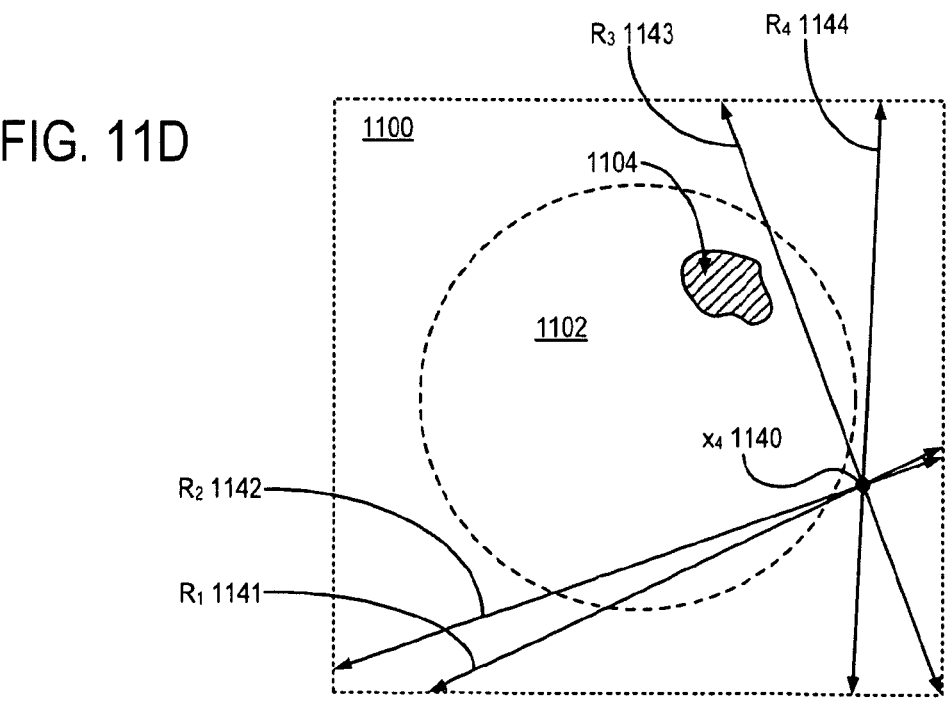
FIG. 11D is yet another pictorial representation of an exemplary point in image data acquired from a subject that is processed according to a method of the present invention.

Referring particularly to FIG. 11C, a voxel located in the highly attenuating region 1104 is determined completely according to the present invention. Such a point $x_3$ 1130 in the object 1102 is represented by a corresponding voxel, $V_3$, in a reconstructed image. Contributions to the image intensity of the voxel, $V_3$, include information from four raysums, $p_1$, $p_2$, $p_3$, and $p_4$. Accordingly, the four raysums ($p_1$, $p_2$, $p_3$, and $p_4$) correspond to the summed attenuation coefficients along the respective projections, $R_1$ 1131, $R_2$ 1132, $R_3$ 1133, and $R_4$ 1134. Since each projection ($R_1$ 1131, $R_2$ 1132, $R_3$ 1133, and $R_4$ 1134) passes through the object 1102, none of the corresponding raysums ($p_1$, $p_2$, $p_3$, and $p_4$) are substantially equal to zero. Therefore, the voxel, $V_3$, corresponding to point $x_3$ 1130 is not set to zero as described above with respect to step 702. Instead, the reconstruction process proceeds as indicated above at step 706. Because point $x_3$ 1130 lies within the highly attenuating region 1104, all of the raysums ($p_1$, $p_2$, $p_3$, and $p_4$) that contribute to the corresponding voxel, $V_3$, will accordingly correspond to projections ($R_1$ 1131, $R_2$ 1132, $R_3$ 1133, and $R_4$ 1134) that each pass through the highly attenuating region 1104. As a result, each raysum ($p_1$, $p_2$, $p_3$, and $p_4$) will include attenuation coefficient values indicative of the highly attenuating region 1104 and will accordingly be weighted as described above in step 708. It should be noted that by employing the method of the present invention, the information corresponding to point $x_3$ 1130 is not lost or removed from the resulting image. Instead, since each raysum ($p_1$, $p_2$, $p_3$, and $p_4$) is equally weighted, the representation of point $x_3$ 1130 as voxel, $V_3$, will still contain information indicative of the highly attenuating region 1104. Therefore, while the present invention provides a method for substantially suppressing image artifacts corresponding to highly attenuating regions, it also provides a method that maintains the information and integrity of voxels located in the highly attenuating region 1104.

Referring particularly to FIG. 8D, voxels located outside the subject of the examination may be set to zero. Such a point $x_4$ 1140 in the object 1102 is represented by a corresponding voxel, $V_4$, in a reconstructed image. Contributions to the image intensity of the voxel, $V_4$, include information from four raysums, $p_1$, $p_2$, $p_3$, and $p_4$. Accordingly, the four raysums ($p_1$, $p_2$, $p_3$, and $p_4$) correspond to the summed attenuation coefficients along the respective projections, $R_1$ 1141, $R_2$ 1142, $R_3$ 1143, and $R_4$ 1144. In this example, the projection $R_4$ 1144 does not pass through the object 1102. Accordingly, the corresponding raysum, $p_4$, is substantially zero because the x-rays that traverse the projection $R_4$ 1144 will not be substantially attenuated with respect to x-rays that pass through the object 1102. Therefore, the corresponding voxel, $V_4$, is automatically given a value of zero, as described above with respect to step 702. This reduces the computational burden of the overall method by eliminating the need to reconstruct an image voxel that would otherwise be substantially zero since it corresponds to a point $x_4$ 1140 that lies outside of the object 1102.

The present invention is designed to work with computed tomography imaging systems and methods, particularly for neurological applications. In the alternative, however, the present invention may be employed in a variety different imaging modalities such as positron emission tomography (PET) imaging and single photon emission computed tomography (SPECT) imaging. Moreover, the clinical application of the present invention is not limited to neurological applications and can be utilized in numerous other clinical areas of practice including cardiothoracic imaging.

The present invention has been described in terms of one or more preferred embodiments, and it should be appreciated that many equivalents, alternatives, variations, and modifications, aside from those expressly stated, are possible and within the scope of the invention.

The invention claimed is:

1. A method of producing an image of a subject that is positioned within a field-of-view of an x-ray imaging system, the steps comprising:
   a) acquiring, with the x-ray imaging system, a plurality of projection views of the subject, wherein each projection view has a raysum value indicative of a physical attribute of the subject along a particular ray path;
   b) determining the ray path of each projection view that passes through a selected voxel in the field-of-view;
   c) producing backprojected values using the raysum values for each ray path determined in step b), wherein:
      i) the backprojected value is produced using the raysum value when the raysum value is below a preset threshold; and
      ii) the backprojected value is produced using a weighted raysum value when the raysum value is above the preset threshold; and
   d) reconstructing an image of the subject from the backprojected values produced in step c).

2. The method as recited in claim 1 in which step d) further includes deconvolving the reconstructed image.

3. The method as recited in claim 2 in which the reconstructed image is deconvolved by:
   d)i) selecting a voxel location in the reconstructed image;
   d)ii) producing an array of voxels that includes the voxel selected in step d)i) and at least two voxels adjacent thereto; and
   d)iii) calculating a deconvolved voxel value along a line in the array of voxels using a decay rate.

4. The method as recited in claim 3 in which the deconvolved voxel value is calculated in step d)iii) using three collinear voxels in the array of voxels produced in step d)ii) and using the following equation:

$$I_{22} = \frac{V_{22}(1-\lambda^4) - V_{12}(\lambda-\lambda^3) - V_{32}(\lambda-\lambda^3)}{1+\lambda^4 - 2\lambda^2};$$

wherein:

$\lambda$=a decay rate;

$V_{22}$=a value of the voxel selected in step d)i);

$V_{12}$=a value of a first collinear voxel in the array of voxels produced in step d)ii);

$V_{32}$=a value of a second collinear voxel in the array of voxels produced in step d)ii); and $I_{22}$=the deconvolved voxel value.

5. The method as recited in claim 1 in which step c)ii) includes producing the weighted raysum value by multiplying the raysum value by a weighting factor.

6. The method as recited in claim 5 in which the weighting factor is 1/1000.

7. The method as recited in claim 5 in which step c) further includes producing a divisor value for the selected voxel by adding the number of raysum values produced in step c)i) to the sum of the weighting factors applied in step c)ii).

8. The method as recited in claim 7 in which step d) includes producing a divisor image by assigning the divisor value for each selected voxel to a corresponding voxel location in the divisor image.

9. The method as recited in claim 8 in which step d) further includes producing a divided image by dividing the reconstructed image by the produced divisor image.

10. The method as recited in claim 9 in which step d) further includes deconvolving the divided image.

11. The method as recited in claim 10 in which in which the divided image is deconvolved in step d) by:

d)i) selecting a voxel location in the reconstructed image;

d)ii) producing an array of voxels that includes the voxel selected in step d)i) and at least two voxels adjacent thereto; and d)iii) calculating a deconvolved voxel value along a line in the array of voxels using a decay rate.

12. The method as recited in claim 1 in which the preset threshold is 1100 Hounsfield units.

13. The method as recited in claim 1 in which voxels containing a ray path that passes through a portion of the field-of-view not containing the subject are set to zero.

* * * * *